(12) United States Patent
Sung et al.

(10) Patent No.: US 9,664,435 B2
(45) Date of Patent: May 30, 2017

(54) REFRIGERATOR HAVING DOOR WITH DISPLAY DEVICE

(71) Applicant: SAMSUNG ELECTRONICS CO., LTD., Suwon-si, Gyeonggi-do (KR)

(72) Inventors: Do Soo Sung, Suwon-si (KR); Heung Seob Choi, Suwon-si (KR); Man Yeob Lee, Suwon-si (KR); Jong Tak Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 14/593,345

(22) Filed: Jan. 9, 2015

(65) Prior Publication Data

US 2015/0122825 A1   May 7, 2015

Related U.S. Application Data

(63) Continuation of application No. 14/242,120, filed on Apr. 1, 2014, now Pat. No. 8,960,934.

(30) Foreign Application Priority Data

Apr. 8, 2013  (KR) .................. 10-2013-0038051
Jul. 30, 2013  (KR) .................. 10-2013-0090529

(51) Int. Cl.
*F25D 23/02*    (2006.01)
*G06F 3/044*    (2006.01)
(Continued)

(52) U.S. Cl.
CPC ........... *F25D 23/028* (2013.01); *F25D 23/00* (2013.01); *F25D 23/02* (2013.01); *F25D 23/065* (2013.01);
(Continued)

(58) Field of Classification Search
CPC ...... F25D 23/028; F25D 23/00; F25D 23/065; F25D 27/00; F25D 29/005
See application file for complete search history.

(56) References Cited

U.S. PATENT DOCUMENTS

| 4,458,134 | A  | 7/1984  | Ogle |
| 4,490,986 | A  | 1/1985  | Paddock |
| 6,954,985 | B2 | 10/2005 | Lee et al. |
| 8,567,885 | B2 | 10/2013 | Lee et al. |
| 8,752,919 | B2 | 6/2014  | Park et al. |

(Continued)

FOREIGN PATENT DOCUMENTS

| CN | 101939605 | 1/2011 |
| JP | 2002-39673 | 2/2002 |

(Continued)

OTHER PUBLICATIONS

European Search Report issued May 15, 2015 in corresponding European Patent Application No. 14163908.8.

(Continued)

*Primary Examiner* — David V Bruce
(74) *Attorney, Agent, or Firm* — Staas & Halsey LLP

(57) ABSTRACT

A door of a refrigerator includes a front panel formed of a metal material, a display unit including a display portion which is disposed at a rear side of the front panel and on which operating information of the refrigerator is displayed when the display portion becomes bright or dark, and a plurality of through holes formed in a region of the front panel corresponding to the display portion. Although the display unit is hidden inside the door, information displayed on the display unit can be seen to a user through the plurality of through holes.

22 Claims, 13 Drawing Sheets

(51) Int. Cl.
  *F25D 29/00* (2006.01)
  *F25D 23/00* (2006.01)
  *F25D 27/00* (2006.01)
  *F25D 23/06* (2006.01)
(52) U.S. Cl.
  CPC ........... *F25D 27/00* (2013.01); *F25D 29/005* (2013.01); *G06F 3/044* (2013.01); *F25D 2400/361* (2013.01); *Y10T 29/49359* (2015.01); *Y10T 29/49826* (2015.01)

(56) References Cited

U.S. PATENT DOCUMENTS

| | | | |
|---|---|---|---|
| 2010/0045617 A1 | 2/2010 | Lee | |
| 2010/0107679 A1 | 5/2010 | Park et al. | |
| 2011/0048047 A1* | 3/2011 | Kim | F25D 29/005 62/246 |

FOREIGN PATENT DOCUMENTS

| | | |
|---|---|---|
| JP | 2010-230226 | 10/2010 |
| JP | 2010230226 A * | 10/2010 |
| KR | 10-0864663 | 10/2008 |
| KR | 10-2009-0090518 | 8/2009 |
| KR | 10-2011-0101439 | 9/2011 |
| RU | 2 382 961 C2 | 2/2010 |
| RU | 2 478 174 C2 | 3/2013 |
| WO | 2008/069352 A1 | 6/2008 |

OTHER PUBLICATIONS

International Search Report issued Jul. 9, 2014 in corresponding International Patent Application No. PCT/KR2014/002987.
Notice of Allowance issued Oct. 3, 2014 in copending U.S. Appl. No. 14/242,120.
Australian Notice of Acceptance dated Jul. 7, 2016 from Australian Patent Application No. 2014251552, 2 pages.
Russian Decision on Grant dated Oct. 5, 2016 from Russian Patent Application No. 2015142825/13(066117), 18 pages.
U.S. Office Action dated Jan. 5, 2017 from U.S. Appl. No. 14/593,245.
Chinese Office Action dated Jan. 16, 2017 from Chinese Patent Application No. 201480017701.4, 16 pages.

* cited by examiner

REFRIGERATOR HAVING DOOR WITH DISPLAY DEVICE

CROSS-REFERENCE TO RELATED APPLICATIONS

This application is a continuation of U.S. application Ser. No. 14/242,120, filed on Apr. 1, 2014, which claims the benefit of Korean Patent Application Nos. 10-2013-0038051 and 10-2013-0090529, filed on Apr. 8, 2013 and Jul. 30, 2013, in the Korean Intellectual Property Office, the disclosures of which are incorporated herein by reference.

BACKGROUND

1. Field

Embodiments of the present disclosure relate to a refrigerator having a door on which a display unit is disposed.

2. Description of the Related Art

In general, a refrigerator is a home appliance that keeps food fresh by including a storage compartment for storing food and a cold air supplying unit for supplying cold air to the storage compartment. The storage compartment is open/closed by a door, and a display unit on which operating information of the refrigerator is displayed or to which operating instructions of the refrigerator are input, is disposed on the door.

Among these refrigerators, a refrigerator in which the display unit is hidden in an internal space of the door, so as to improve an aesthetic appeal of an exterior. In this case, a front panel of the door is formed of tempered glass or a transparent resin material so that the information displayed on the display unit can be transmitted to the outside through the front panel.

SUMMARY

Therefore, it is an aspect of the present disclosure to provide a refrigerator having a door including a front panel formed of a metal material and a display unit hidden in an internal space of the door.

Additional aspects of the disclosure will be set forth in part in the description which follows and, in part, will be apparent from the description, or may be learned by practice of the disclosure.

In accordance with one aspect of the present disclosure, a refrigerator includes: a body; storage compartments formed inside the body; and a door that opens/closes the storage compartments, wherein the door may include: a front panel that constitutes a front side and sides of the door and that is formed of an iron plate material, the front panel having through holes that pass through the front panel, wherein the through holes constitute a predetermined shape; a rear panel that is coupled to the rear of the front panel and constitutes a rear side of the door; a foaming space formed between the front panel and the rear panel; an adiabatic material foamed in the foaming space so as to insulate the storage compartments; a display unit including a display portion having a shape corresponding to the shape of the through holes and displaying information when at least a portion of the display portion is turned on or off, the display unit disposed in the rear of the front panel so that a position of the display portion corresponds to a position of the through holes; an upper cap including a body portion and an accommodation space formed inside the body portion so as to accommodate the display unit, the upper cap being coupled to an upper part of the front panel; and a lower cap coupled to a lower part of the front panel, wherein the front of the accommodation space may be open so that light of the display unit is diffused into the through holes, and the upper cap may be disposed to closely contact a rear side of the front panel so that the adiabatic material in the foaming space is prevented from permeating the accommodation space.

The refrigerator may further include a sealing member disposed on a front side of the body portion of the upper cap so as to seal a space between the body portion of the upper cap and the front panel.

The upper cap may further include an insertion groove which is formed in a top end of the body portion and through which the display unit is inserted into the accommodation space.

The display unit may further include a light source portion that emits light and a guide portion that guides light of the light source portion to the display portion The display unit may further include a cover sheet on which the display portion is formed and which is coupled to the guide portion.

The predetermined shape of the display portion may include at least one selected from the group consisting of a picture, a character, a number, and a symbol.

The guide portion may include guide holes formed to have sizes thereof gradually increasing from the light source portion to the display portion.

The refrigerator may further include a filler member filled in the through holes.

The filler member may be a silicon resin or an ultraviolet (UV) resin.

A diameter of the through holes may be 0.1 to 0.5 mm.

A distance between the through holes may be 0.3 to 1.5 mm.

A thickness of the front panel may be 0.6 mm or less.

The through holes may be formed through an etching process or a laser drilling process.

The display unit may further include an input unit having a capacitance touch button, and the input unit may sense touch of a particular region of the front panel corresponding to the capacitance touch button and may receive operating instructions of the refrigerator.

In accordance with another embodiment of the present disclosure, a refrigerator includes: a body; storage compartments formed inside the body; and a door that opens/closes the storage compartments, wherein the door may include: a front panel that constitutes a front side and sides of the door and that is formed of an iron plate material, the front panel having through holes that pass through the front panel, wherein the through holes constitute a predetermined shape; a rear panel that is coupled to the rear of the front panel and constitutes a rear side of the door; a foaming space formed between the front panel and the rear panel; an adiabatic material foamed in the foaming space so as to insulate the storage compartments; a display unit including a display portion having a shape corresponding to the shape of the through holes and displaying information when at least a portion of the display portion is turned on or off, the display unit disposed in the rear of the front panel so that a position of the display portion corresponds to a position of the through holes; an upper cap coupled to an upper part of the front panel; and a lower cap coupled to a lower part of the front panel, wherein the upper cap may include: an accommodation space in which the display unit is accommodated; an insertion groove which is formed in a top surface of the upper cap and through which the display unit is inserted into the accommodation space; and a body portion disposed at vertical and horizontal sides and a rear side of the accommodation space so that the accommodation space is separated and partitioned off from the foaming space.

The refrigerator may further include a sealing member disposed on a front side of the body portion of the upper cap so as to seal a space between the body portion of the upper cap and the front panel.

The refrigerator may further include a cover coupled to the insertion groove so as to seal the insertion groove after the display unit has been inserted into the accommodation space through the insertion groove.

In accordance with another embodiment of the present disclosure, a refrigerator includes: a body; storage compartments formed inside the body; and a door that opens/closes the storage compartments, wherein the door may include: a front panel that constitutes a front side and sides of the door and that is formed of an iron plate material, the front panel having through holes that pass through the front panel, wherein the through holes constitute a predetermined shape; a rear panel that is coupled to the rear of the front panel and constitutes a rear side of the door; a foaming space formed between the front panel and the rear panel; an adiabatic material foamed in the foaming space so as to insulate the storage compartments; a display unit including a display portion having a shape corresponding to the shape of the through holes and displaying information when at least a portion of the display portion is turned on or off, the display unit disposed in the rear of the front panel so that a position of the display portion corresponds to a position of the through holes; and a filler member filled in the through holes so that foreign substances are prevented from permeating an internal space of the through holes.

The filler member may be an ultraviolet (UV) paint.

Air may be removed from the internal space of the through holes.

The filler member may not overflow to a surface of a front side or a rear side of the front panel except the internal space of the through holes.

The filler member may be transparent.

A diameter of the through holes may be 0.1 to 0.5 mm.

A distance between the through holes may be 0.3 to 1.5 mm.

In accordance with still another embodiment of the present disclosure, a method of manufacturing a refrigerator including a body, storage compartments, and a door that opens/closes the storage compartments and includes a front panel formed of an iron plate material, through holes being formed in the front panel, includes: forming the through holes in the front panel by performing an etching or laser process; and filling a filler member in the through holes so that foreign substances are prevented from permeating an internal space of the through holes.

The filler member may be an ultraviolet (UV) paint.

The filling of the filler member in the through holes may include attaching a protective vinyl to a front side of the front panel.

The filling of the filler member in the through holes may include applying the filler member into the through holes through a rear side of the front panel to which no protective vinyl is attached.

The filling of the filler member in the through holes may include removing air generated in an internal space of the through holes.

The removing of the air generated in the internal space of the through holes may include removing the air using vacuum.

The filling of the filler member in the through holes may include a squeegee process of pushing the filler member that overflows to a surface of the front side or the rear side of the front panel except the internal space of the through holes.

In accordance with yet still another embodiment of the present disclosure, a method of filling a filler member in through holes formed in a plate, includes: applying the filler member into the through holes; removing air generated in an internal space of the through holes using vacuum; and pushing the filler member that overflows to a surface of a front side or a rear side of the plate except the internal space of the through holes.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
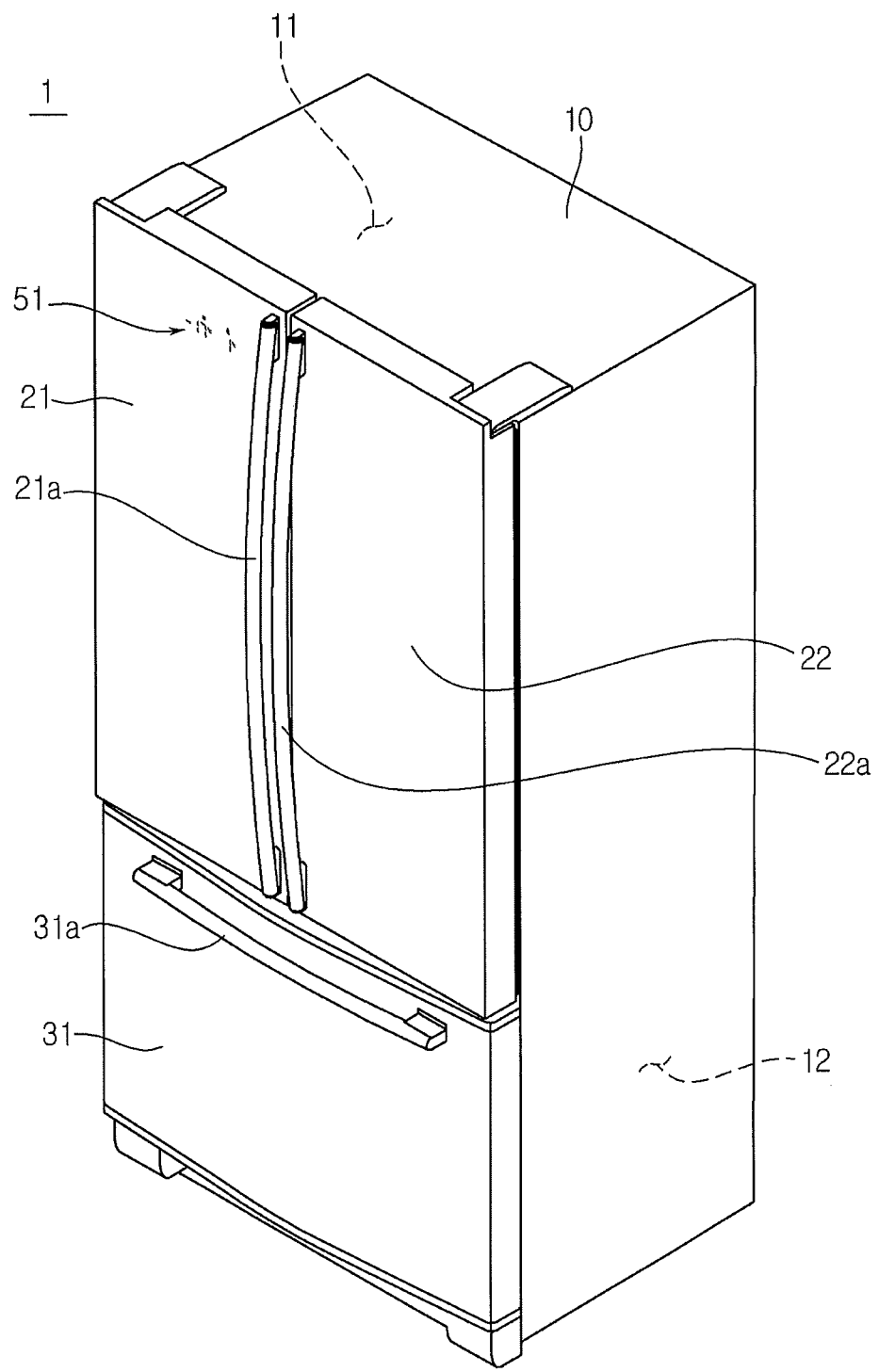
FIG. 1 illustrates an exterior of a refrigerator in accordance with an embodiment of the present disclosure.

Reference will now be made in detail to the embodiments of the present disclosure, examples of which are illustrated in the accompanying drawings, wherein like reference numerals refer to like elements throughout.

FIG. 1 illustrates an exterior of a refrigerator in accordance with an embodiment of the present disclosure.

Referring to FIG. 1, a refrigerator 1 includes a body 10, storage compartments 11 and 12 provided inside the body 10, and a cold air supplying unit (not shown) that supplies cold air to the storage compartments 11 and 12.

The storage compartments 11 and 12 may be partitioned off into an upper refrigerator compartment 11 and a lower freezer compartment 12 by an intermediate wall. The refrigerator compartment 11 may be maintained at a temperature of about 0° C. so as to keep food under refrigeration. The refrigerator compartment 11 has an open front side via which food can be put in or taken out from the refrigerator compartment 11. The open front side may be open/closed by a pair of doors 21 and 22 that are rotatably coupled to the body 10. Handles 21a and 22a may be disposed on the pair of doors 21 and 22.

The freezer compartment 12 may be maintained below a temperature of 0° C. so as to keep food frozen. The freezer compartment 12 has an open front side via which food can be put in or taken out from the freezer compartment 12. The open front side may be open/closed by a door 31 that is slidably disposed in a forward/backward direction. A handle 31a may be disposed on the door 31.

A plurality of through holes 51 through which operating information of the refrigerator 1 is displayed, may be formed in one of the doors 21 and 22. At least a portion of the plurality of through holes 51 becomes bright or dark so that a particular shape can be displayed and thus operating information of the refrigerator 1 can be displayed through the through holes 51. The configuration of the through holes 51 will be described below.

Even though a French Door Refrigerator (FDR) is illustrated in the current embodiment of the present disclosure, embodiments of the present disclosure are not limited thereto, and all types of refrigerators may be used.

Figure 2:
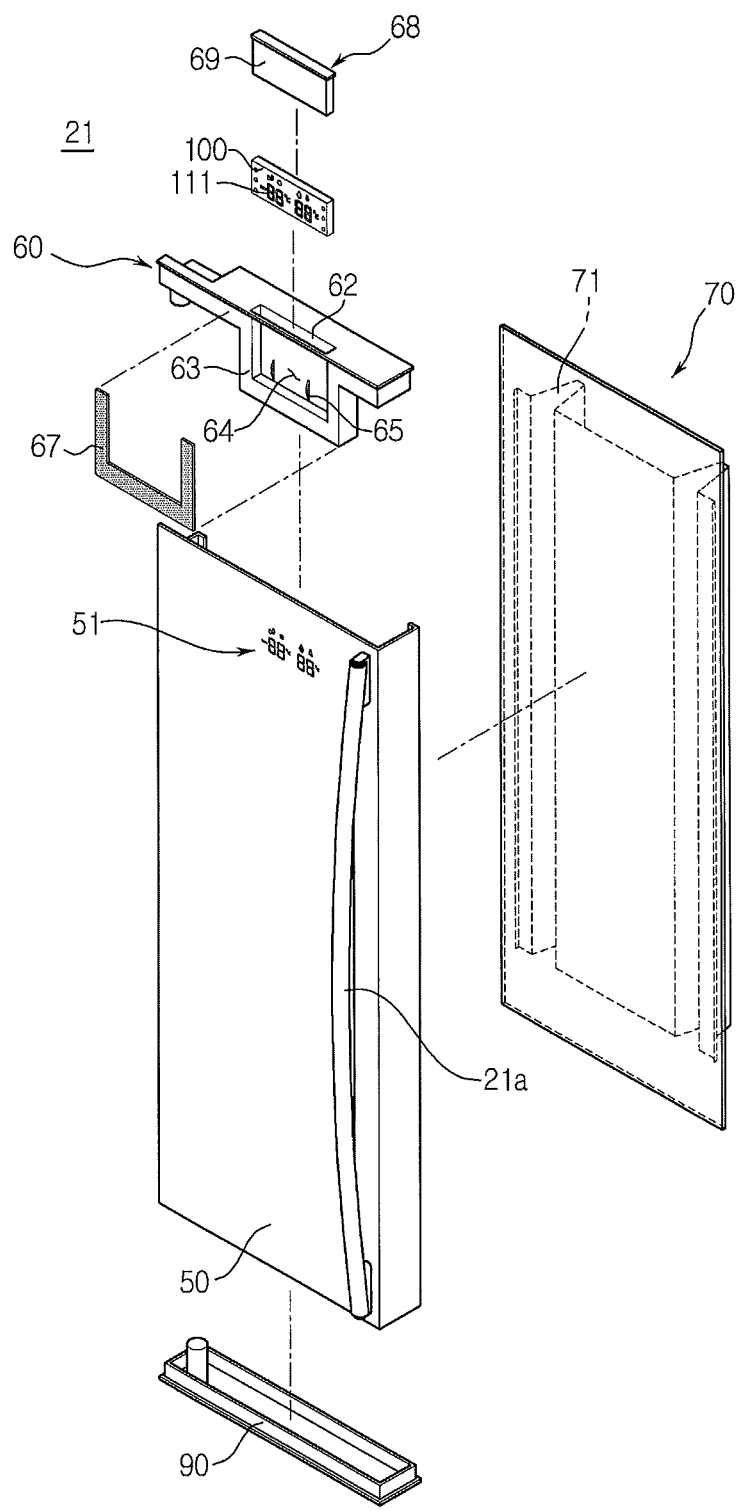
FIG. 2 is a schematic exploded perspective view of a door of the refrigerator illustrated in FIG. 1.
Figure 3:
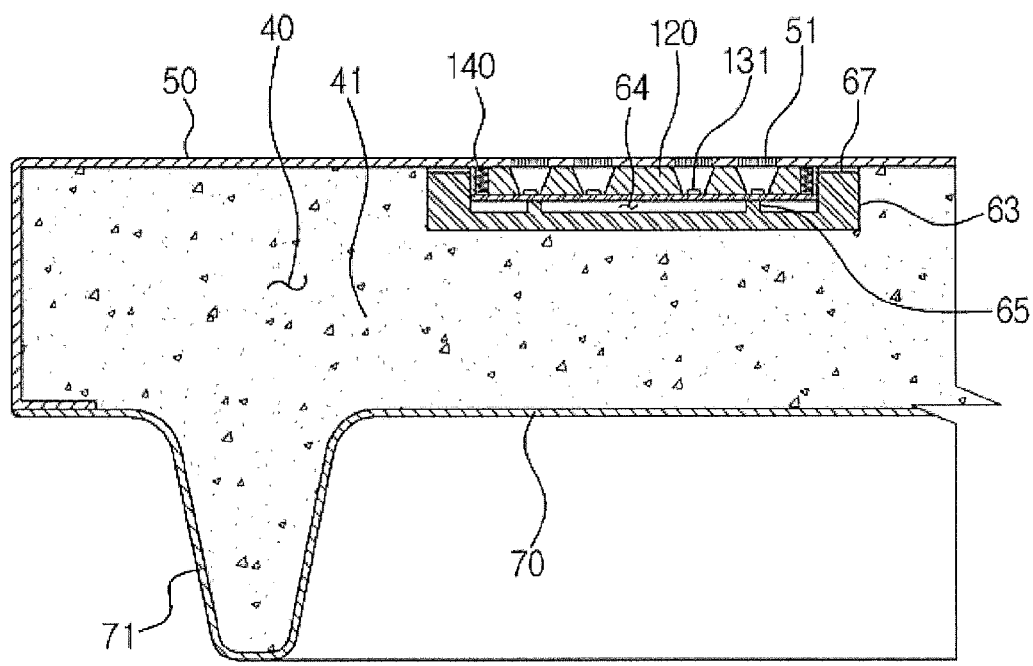
FIG. 3 is a cross-sectional view of the door of the refrigerator of FIG. 1.

FIG. 2 is a schematic exploded perspective view of a door of the refrigerator illustrated in FIG. 1, and FIG. 3 is a cross-sectional view of the door of the refrigerator of FIG. 1.

Referring to FIGS. 2 and 3, the door 21 may be formed by coupling a front panel 50 that constitutes a front side and both sides of the door 21, a rear panel 70 that is coupled to a rear side of the front panel 50 and constitutes a rear side of the door 21, and an upper cap 60 and a lower cap 90 that seal top and bottom ends of an internal space formed between the front panel 50 and the rear panel 70, to each other.

The handle 21a may be disposed on the front panel 50. The front panel 50 may be formed of a metal material, such as steel, aluminum, an alloy, a phase change material (PCM), and a voice coil motor (VCM) material. The front panel 50 may be formed by bending one plate to constitute the front side and both sides of the door 21.

The front panel 50 may have a larger strength than the strength of a tempered glass plate or a resin plate due to characteristics of a metal material and may also give a luxurious feeling to a user. The aesthetic appeal of the front panel 50 may be further improved through surface treatment of the metal.

That is, a hair line process, a mirror polishing process, or a bead blast process may be performed on the surface of the front panel 50. In this case, one among these processes may be performed on the front panel 50.

Alternatively, all of the above-described plurality of processes may be performed on the front panel 50. That is, the front panel 50 may have all of hair line patterns, gloss, and beads. In this case, a process order may be the order of the mirror polishing process, the hair line process, and the bead blast process.

The rear panel 70 may be vacuum-formed using a resin material. The rear panel 70 may have a dyke 71 that protrudes backwards so that a door pocket can be mounted in the rear panel 70.

Each of the upper cap 60 and the lower cap 90 may be injection-molded using a resin material. The front panel 50, the rear panel 70, the upper cap 60, and the lower cap 90 are temporarily assembled using an insertion coupling structure and an adhesive tape, and then an adiabatic material foaming solution can be injected and foamed into the internal space.

That is, a foaming space 40 in which an adiabatic material 41 is foamed, is formed between the front panel 50 and the rear panel 70. The adiabatic material 41 may be used to insulate the storage compartment 11, and urethane may be used as the adiabatic material 41. If foaming of the adiabatic material foaming solution into the foaming space 40 is completed, the front panel 50, the rear panel 70, the upper cap 60, and the lower cap 90 can be firmly coupled to each other due to an adhesive force of the foaming solution.

A display unit 100 on which operating information of the refrigerator 1 may be displayed or to which operating instructions of the refrigerator 1 may be input, is disposed in an internal space of the door 21. The display unit 100 may be disposed to closely contact the rear side of the front panel 50.

The display unit 100 may be accommodated in the upper cap 60 coupled to an upper part of the front panel 50 and may be supported thereon. The display unit 100 may be fixed in such a way that a display portion 111 is placed at a position corresponding to the through holes 51 of the front panel 50.

The upper cap 60 includes a body portion 63 and an accommodation space 64 which is formed inside the body portion 63 so that the front of the accommodation space 64 is open and in which the display unit 100 is accommodated. That is, the accommodation space 64 is formed in the form of a groove in the front of the body portion 63. Also, an insertion groove 62 through which the display unit 100 can be inserted into the accommodation space 64, is formed in a top surface 61 of the upper cap 60.

The front of the accommodation space 64 is open because light of the display portion 111 of the display unit 100 accommodated in the accommodation space 64 can be diffused into the through holes 51 of the front panel 50.

Fixing protrusions 65 that pressurize the display unit 100 forwards so as to fix the display unit 100, may be disposed in the accommodation space 64. The fixing protrusions 65 may protrude from the body portion 63 forwards. The fixing protrusions 65 may have approximately gentle curved surfaces so as to guide movement of the display unit 100 inserted into the accommodation space 64 from upwards to downwards. The fixing protrusions 65 may be provided as an elastic member having elasticity.

When the foaming solution of the adiabatic material 41 is injected and foamed into the foaming space 40, the foaming solution of the adiabatic material 41 should not permeate the accommodation space 64. To this end, the upper cap 60 is disposed such that a front side of the body portion 63 can closely contact the rear side of the front panel 50.

The body portion 63 of the upper cap 60 closely contacts the rear side of the front panel 50 so that the accommodation space 64 formed inside the body portion 63 may be separated and partitioned off from the foaming space 40. That is, vertical and horizontal sides and a rear side of the accommodation space 64 may be covered by the body portion 63, and a front side of the accommodation space 64 may be covered by the rear side of the front panel 50.

A sealing member 67 may be disposed on the front side of the body portion 63 so as to guarantee sealing of the accommodation space 64 and the foaming space 40. The sealing member 67 may be formed of an elastic material, such as rubber, or an adhesive material, such as a tape. When the upper cap 60 is coupled to the upper part of the front panel 50, the sealing member 67 may closely contact the rear side of the front panel 50 and may seal the accommodation space 64 in a separate space.

The upper cap 60 may further include a cover 68 that seals the insertion groove 62 after the display unit 100 has been inserted into the accommodation space 64 through the insertion groove 62. The cover 68 may have a pressurization portion 69 that pressurizes the display unit 100 and prevents the display unit 100 from moving in a vertical direction.

In the present embodiment, the accommodation space 64 in which the display unit 100 is accommodated, and the body portion 63 that separates and partitions off the accommodation space 64 from the foaming space 40 are formed integrally with the upper cap 60. However, embodiments of the present disclosure are not limited thereto, and the accommodation space 64 and the body portion 63 may be separately disposed and may be fixed and coupled to the upper cap 60.

Through this structure, the display unit 100 may be mounted in the internal space of the door 21 and is not exposed to the outside. However, if particular information is displayed on the display unit 100, the information may be displayed to the outside through the plurality of through holes 51.

Figure 4:
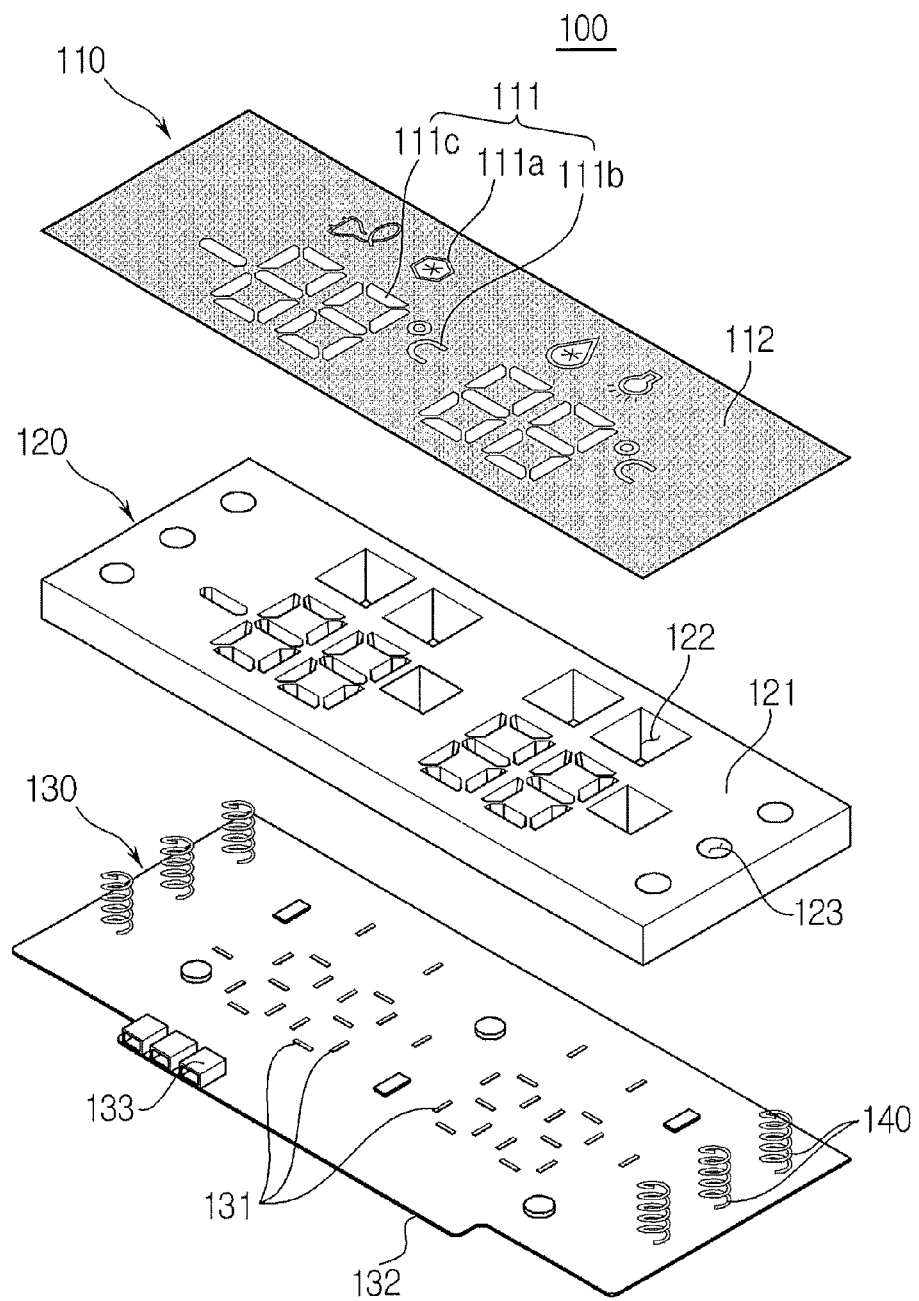
FIG. 4 is an exploded view of a display unit of the refrigerator of FIG. 1.

FIG. 4 is an exploded view of a display unit of the refrigerator of FIG. 1.

Referring to FIG. 4, the display unit 100 may include a cover sheet 110, a light source portion 130 that emits light, and a guide portion 120 that guides light emitted from the light source portion 130 to the display portion 111.

The cover sheet 110 may include the display portion 111 that becomes bright or dark so as to display operating information of the refrigerator 1 and a blocking portion 112 that is always maintained in a relatively dark state. The display portion 111 may be formed of a transparent material or a fluorescent material, and the blocking portion 112 may be formed of an opaque material.

The cover sheet 110 may be disposed separately from the guide portion 120 and may be attached to one surface of the guide portion 120.

The display portion 111 may be configured as one of a picture 111a, a character 111b, a number, a symbol, and a segment 111c that constitutes a portion of the number and the symbol, or a combination thereof, so as to display the operating information of the refrigerator 1. Thus, if light is radiated onto the cover sheet 110, the picture 111a, the character 111b, and the number and the symbol 111c of the display portion 111 appear bright, and the operating information may be displayed on the display portion 111.

The light source portion 130 may include a light emitting diode (LED) 131 that emits light, a printed circuit board (PCB) 132 on which the LED 131 is mounted, and a connector 133 to which power is connected. A plurality of LEDs 131 may be disposed and may be individually controlled.

Figure 7:
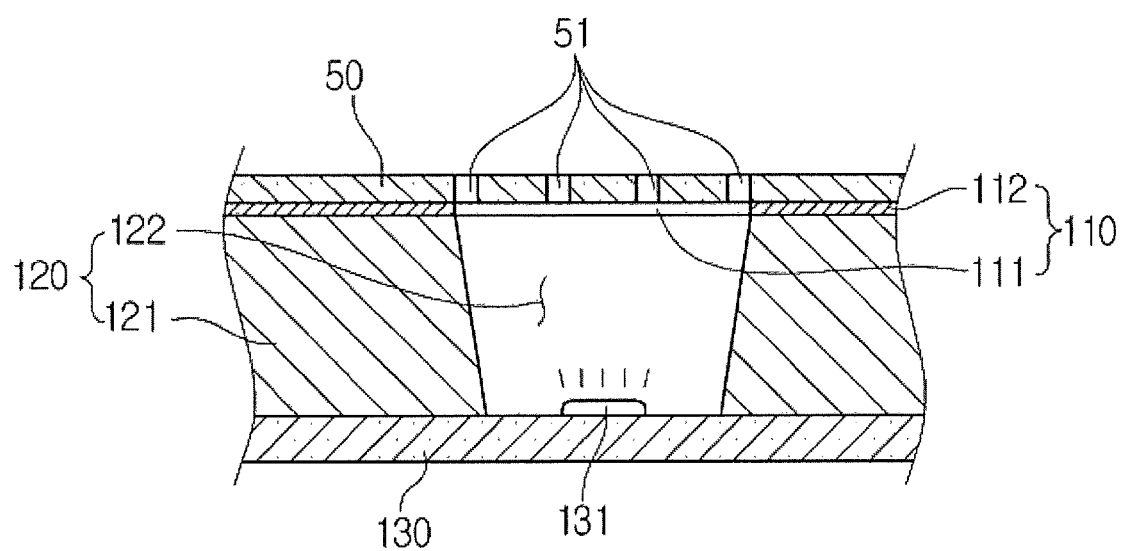
FIG. 7 is a cross-sectional view taken along line B-B of FIG. 5.
Figure 8:
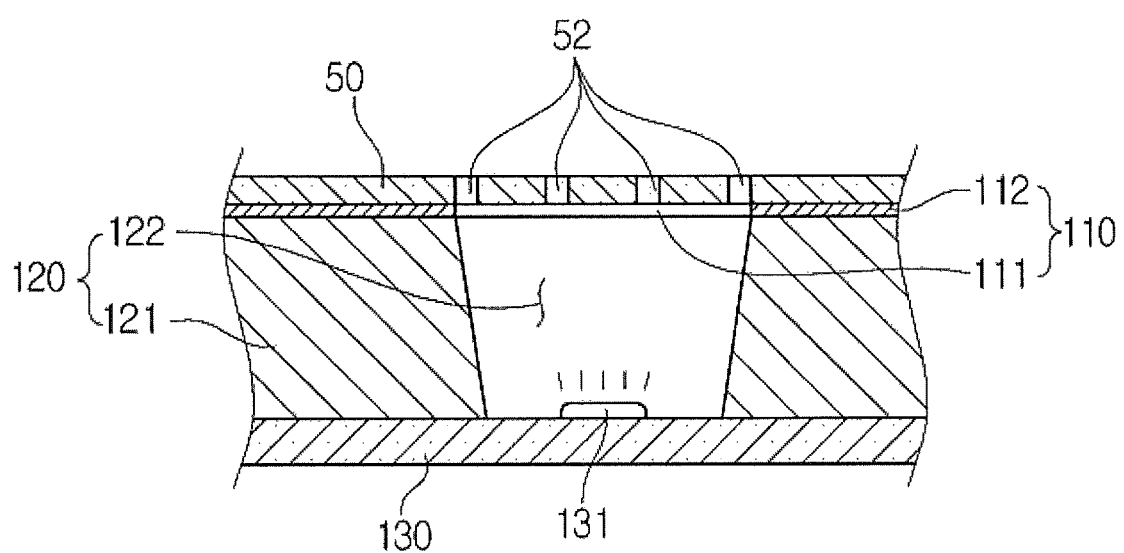
FIG. 8 illustrates a filler member filled in the through holes in FIG. 7.

The guide portion 120 guides light emitted from the LEDs 131 to direct toward the cover sheet 110. The guide portion 120 may include a body portion 121 formed of a material that reflects light and guide holes 122 formed to pass through the body portion 121. The guide holes 122 may be formed to have sizes thereof that gradually increase from the LEDs 131 to the cover sheet 110, as illustrated in FIGS. 7 and 8.

The display unit 100 may further include an input unit to which operating instructions of the refrigerator 1 are input. A capacitance touch sensing method may be used in the input unit.

For example, the input unit may have a spring-shaped touch button 140 and a sensor (not shown) that measures a change in charges generated by a user's touch. The touch button 140 may be mounted on the printing circuit board 132, may pass through button holes 123 of the guide portion 120, and may contact the cover sheet 110.

If the user touches a particular region of the front panel 50 corresponding to a position of the touch button 140, the sensor may measure a change in charges that flow through the touch button 140 and may sense whether the user touches the particular region of the front panel 50 or not. Various well-known methods, such as a decompression method, a dome switch method, an infrared (IR) proximity sensing method as well as the capacitance touch sensing method may be used in the input unit.

The display portion 111 may be formed integrally with the guide portion 120. In this case, an additional cover sheet may not be disposed on the display unit 100.

Figure 5:
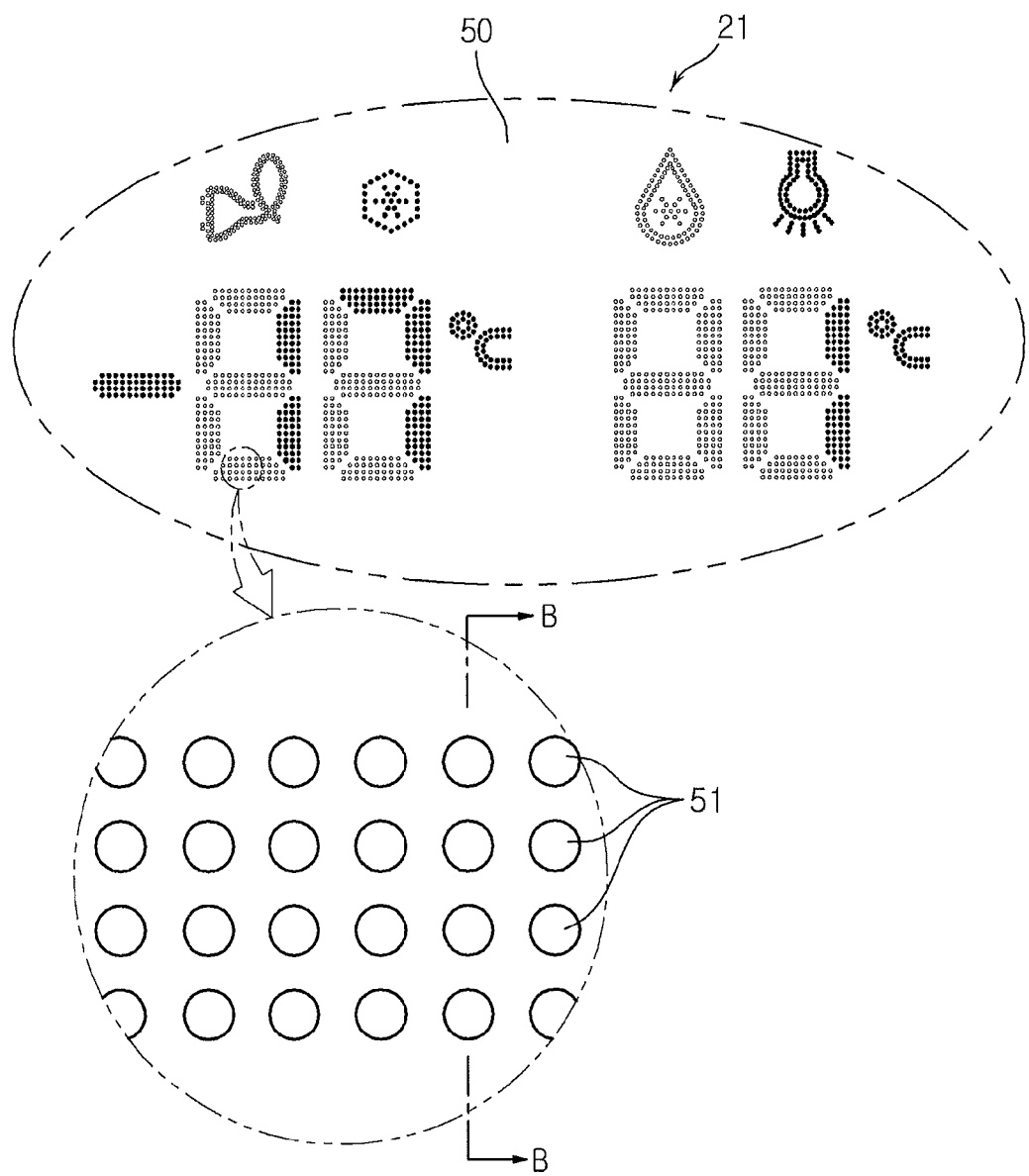
FIG. 5 is an enlarged view of a periphery of through holes of a front panel of the refrigerator of FIG. 1.
Figure 6:
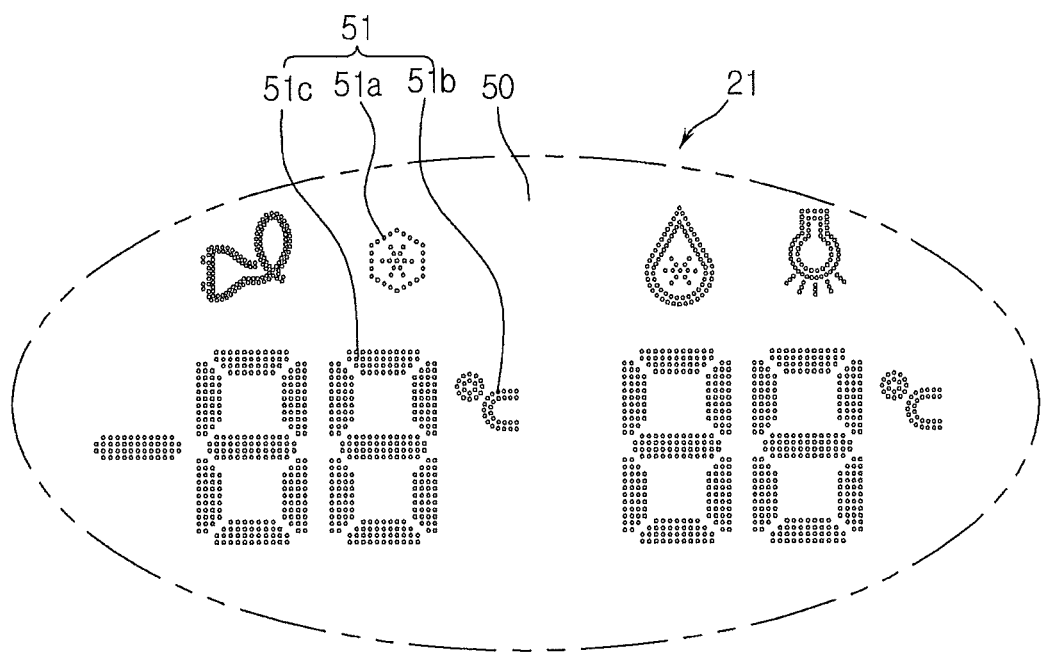
FIG. 6 is an enlarged view of the periphery of the through holes of the front panel in a state in which the display unit of the refrigerator of FIG. 1 is turned off.

FIG. 5 is an enlarged view of a periphery of through holes of a front panel of the refrigerator of FIG. 1, FIG. 6 is an enlarged view of the periphery of the through holes of the front panel in a state in which the display unit of the refrigerator of FIG. 1 is turned off, FIG. 7 is a cross-sectional view taken along line B-B of FIG. 5, and FIG. 8 illustrates a filler member filled in the through holes in FIG. 7.

Referring to FIGS. 5 through 8, if the display unit 100 hidden in the internal space of the door 21 displays particular information, the information may be displayed through the plurality of through holes 51 of the front panel 50 of the door 21, as illustrated in FIG. 5.

The through holes 51 formed in the front panel 50 may have a diameter of about 0.1 to 0.5 mm, and a distance between the through holes 51 may be about 0.3 to 1.5 mm. The through holes 51 may be measured by approximately user's naked eyes. In this case, it is assumed that the thickness of the front panel 50 is 0.6 mm or less.

The through holes 51 may be formed through an etching process or a laser drilling process. When the sizes of the through holes 51 are in the range of 0.3 to 0.4 mm, the etching process having high precision may be appropriate for forming the through holes 51.

When the sizes of the through holes 51 are 0.2 mm or less, some thermal deformation or burr may occur, and the laser drilling process may be used to form the through holes 51. An assessment function of the through holes 51 having relatively small sizes may be lowered if the sizes of the through holes 51 are large. Thus, the sizes of the through holes 51 may be 0.2 mm or less.

For example, the sizes of through holes 51c corresponding to the segment 111c that constitutes a portion of the number in FIG. 3 may be in a range of 0.3 to 0.4 mm, and the sizes of through holes 51a and 51b corresponding to a small picture 111a and a small character 111b may be 0.2 mm or less. The through holes 51 are formed in a predetermined region corresponding to the display portion 111 of the display unit 100.

That is, the through holes 51 may be arranged to constitute shapes, such as a picture 51a, a character 51b, and a number segment 51c, which correspond to the picture 111a, the character 111b, and the number segment 111c of the display portion 111, respectively. Thus, if the LEDs 131 emit light and a particular picture, a character, a number, and a symbol are displayed on the display unit 100, the particular picture, the character, the number, and the symbol may be displayed on the front panel 50 of the door 21.

As illustrated in FIG. 7, consequently, light emitted from the LEDs 131 of the PCB 132 may sequentially pass through the guide holes 122 of the guide portion 120, the display portion 111 of the cover sheet 110, and the plurality of through holes 51 of the front panel 50 and may be recognized by the user.

As illustrated in FIG. 8, a filler member 52 may be filled in the through holes 51 so as to prevent the through holes 51 from clogging due to foreign substances inserted into the through holes 51.

The filler member 52 may be formed of a transparent material or a fluorescent material. The filler member 52 may be a silicon resin or an ultraviolet (UV) resin. The filler member 52 may be filled in the plurality of through holes 51 by applying silicon or a UV paint onto the front panel 50.

In this way, forming the through holes 51 in the front panel 50 of the door 21 and disposing and hiding the display unit 100 inside the door 21 may be applied to not only a refrigerator but also a kitchen home appliance, such as a cooking device.

Figure 9:
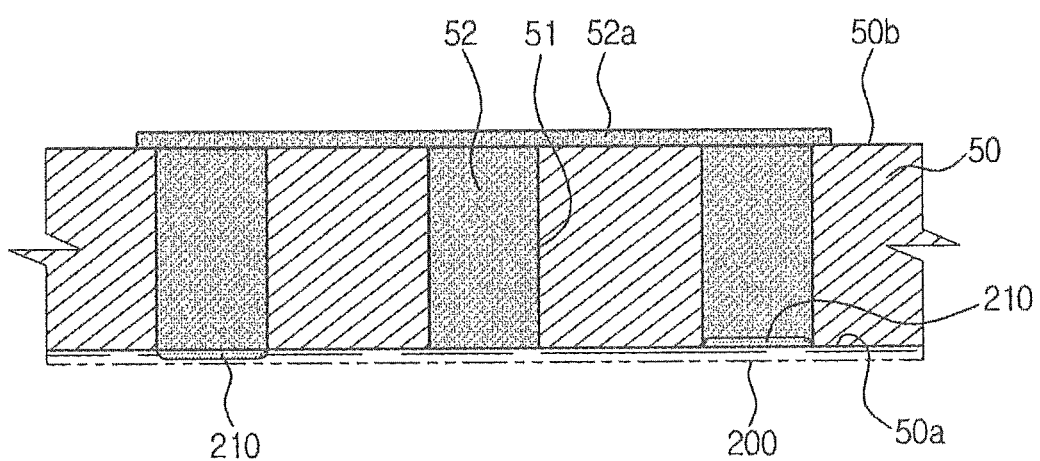
FIG. 9 illustrates a state in which air is generated while the filler member is applied into the through holes, in accordance with an embodiment of the present disclosure.
Figure 10:
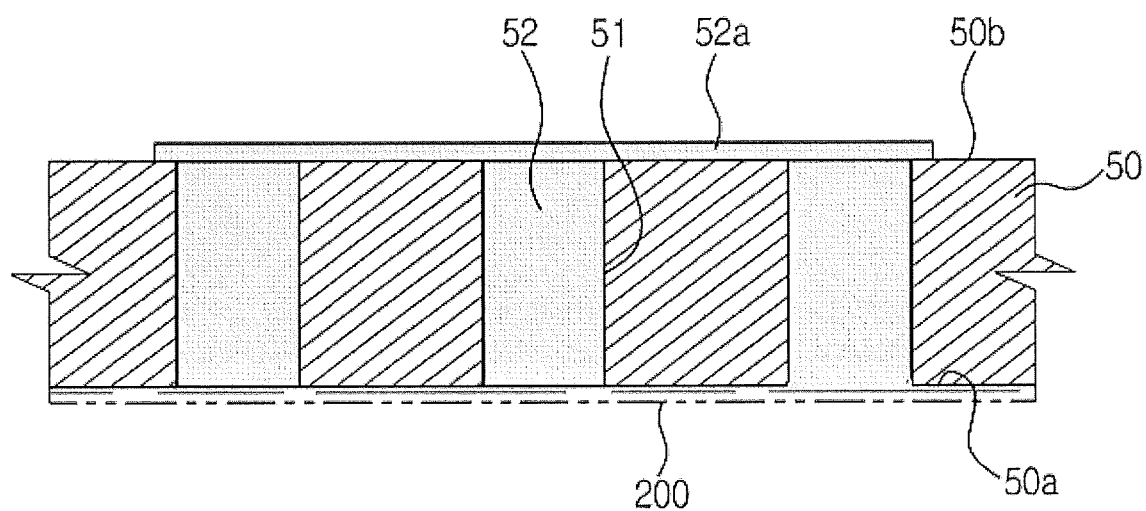
FIG. 10 illustrates a state in which air is removed from the through holes of FIG. 9 using vacuum equipment.
Figure 11:
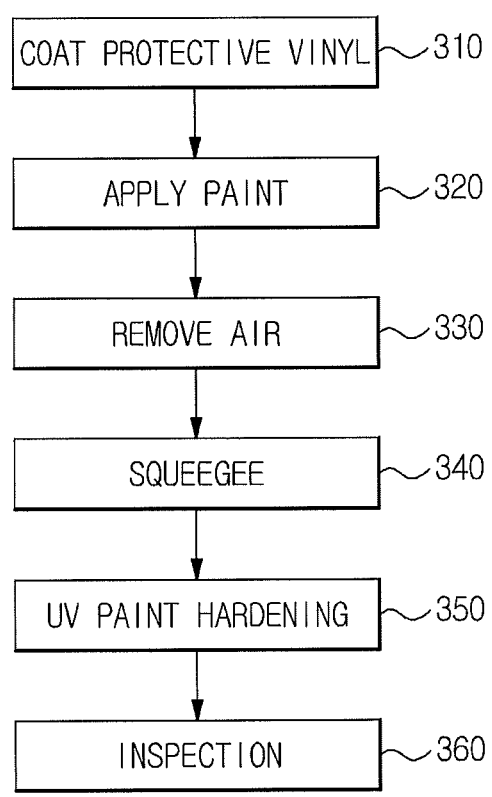
FIG. 11 is a flowchart illustrating a method of filling the filler member in the through holes, in accordance with an embodiment of the present disclosure.

FIG. 9 illustrates a state in which air is generated while the filler member is applied into the through holes, in accordance with an embodiment of the present disclosure, FIG. 10 illustrates a state in which air is removed from the through holes of FIG. 9 using vacuum equipment, and FIG. 11 is a flowchart illustrating a method of filling the filler member in the through holes, in accordance with an embodiment of the present disclosure.

The method of filling a filler member in through holes in accordance with an embodiment of the present disclosure will be described with reference to FIGS. 9 through 11. Here, an example in which a UV paint is used as the filler member, will be described. Hereinafter, all of the filler member, the UV paint, and a paint refer to the same thing.

As illustrated in FIG. 11, the method of filling the filler member 52 in the through holes 51 in accordance with an embodiment of the present disclosure includes coating a protective vinyl (310), applying a paint (320), removing air (330), a squeegeeing operation of pushing the overflowing filler member 52 (340), hardening a UV paint (350), and inspecting (360).

Coating the protective vinyl (310) is an operation of coating a protective vinyl 200 so as to close one of both openings of the through holes 51. In the present embodiment, the protective vinyl 200 is coated on a front side 50a of the front panel 50. However, embodiments of the present disclosure are not limited thereto, and the protective vinyl 200 may be coated on a rear side 50b of the front panel 50.

The protective vinyl 200 needs to be closely coated on the front side 50a of the front panel 50 so that the paint 52 may not escape from the through holes 51. The protective vinyl 200 may be removed if the operation of filling the paint 52 in the through holes 51 is completed.

Applying the paint 52 (320) is substantially an operation of applying a UV paint into the through holes 51. Since the protective vinyl 200 is coated on the front side 50a of the front panel 50, the paint 52 is applied into the through holes 51 through an inlet of the through holes 51 formed in the rear side 50b of the front panel 50.

Applying the paint 52 (320) may be performed by immersing the front panel 50 into a container filled with the paint 52.

As illustrated in FIG. 9, in an operation of applying the paint 52 into all of the plurality of through holes 51, the paint 52 may overflow inevitably in an internal space of the through holes 51 and may be partially applied onto a surface of the rear side 50b of the front panel 50.

For convenience of explanation, a portion of the paint 52 applied onto the surface of the rear side 50b of the front panel 50 (not the internal space of the through holes 51) is referred to as an overflow portion 52a. Although this will be described below, the overflow portion 52a is removed by a squeegee process.

As illustrated in FIG. 9, while the paint 52 is applied, air 210 may be generated in the internal space of the through holes 51. The air 210 causes the paint 52 not to be applied into a portion of the internal space of the through holes 51. Also, the paint 52 may be pushed toward the protective vinyl 200. Thus, an aesthetic appeal is not good in a state in which the paint 52 is filled in the through holes 51.

In order to prevent this phenomenon, if coating the paint 52 is completed, an operation of removing the air 210 generated in the internal space of the through holes 51 is performed. Removing the air 210 may be performed by removing the air 210 using vacuum through vacuum equipment. A state in which the air 210 is removed is illustrated in FIG. 10.

Squeegeeing (340) is a leveling operation by removing the overflow portion 52a of the paint 52 and may be performed by pushing the rear side 50b of the front panel 50 using a push stick. Although this will be described below, the squeegeeing operation may be unnecessary according to the shape of the through holes 51.

Hardening the UV paint (350) is an operation of hardening the UV paint 52 by radiating UV rays onto the UV paint of which applying has been completed.

Inspecting (360) is a final operation of inspecting a filled state of the UV paint 52.

Figure 12:
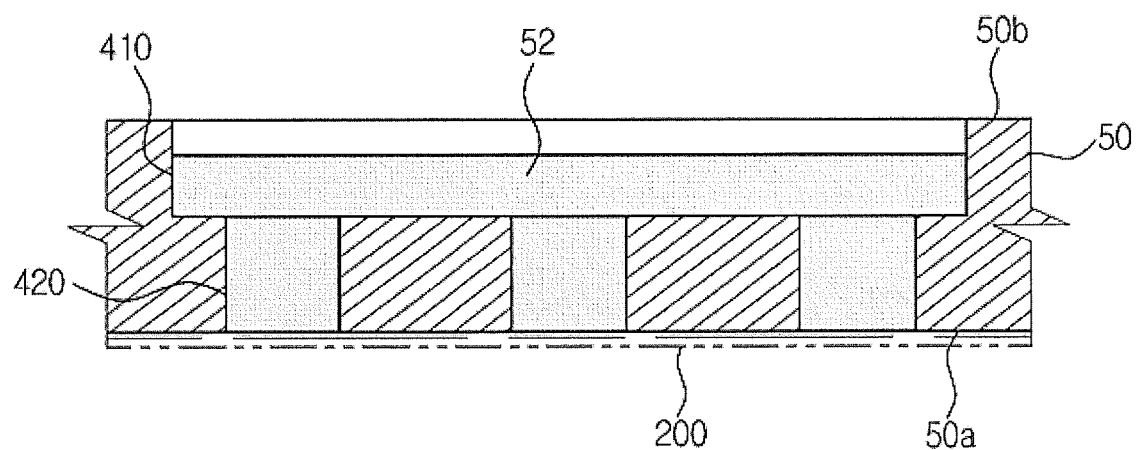
FIG. 12 illustrates a state in which the filler member is applied into the through holes, in accordance with another embodiment of the present disclosure.
Figure 13:
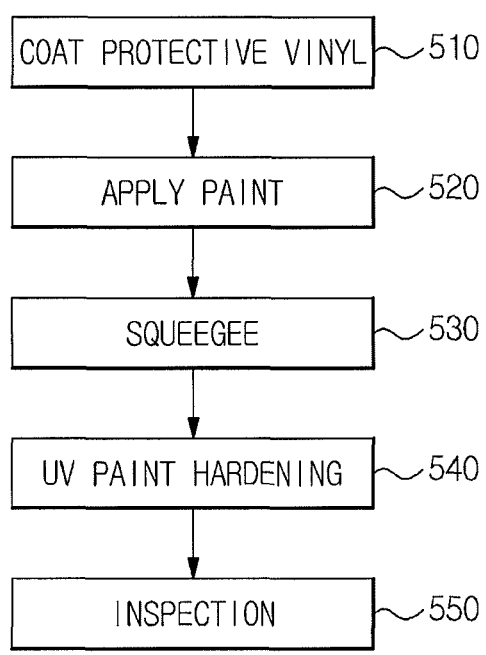
FIG. 13 is a flowchart illustrating a method of filling the filler member in the through holes, in accordance with another embodiment of the present disclosure.

FIG. 12 illustrates a state in which the filler member is applied into the through holes, in accordance with another embodiment of the present disclosure, and FIG. 13 is a flowchart illustrating a method of filling the filler member in the through holes, in accordance with another embodiment of the present disclosure.

As described above, a squeegeeing operation may be unnecessary according to the shape of through holes. For example, as illustrated in FIG. 12, if the front panel 50 is half etched and through holes 410 and 420 include a half-etched portion 410 and a hole portion 420, the squeegeeing operation is not necessary.

This is because the paint 52 can be applied in such a way that the paint 52 is applied into only all of the hole portions 420 of the through holes 410 and 420 and the paint 52 is not applied into a portion of the half-etched portion 410. That is, in this way, when the front panel 50 is half-etched, overflow of the paint 52 may not occur.

By excluding the squeegeeing operation, filling the paint may be performed through the same process as the above-described embodiment. That is, the method of filling a filler member in through holes in accordance with another embodiment of the present disclosure may be performed by sequentially performing coating a protective vinyl (510), applying a paint (520), removing air (530), hardening a UV paint (540), and inspecting (550). These operations are the same as those of the above-described embodiment, and thus descriptions thereof will be omitted.

Air may be removed from the through holes using the filling method, and a filler member may be filled such that overflow of the filler member does not occur. Thus, an aesthetic appeal of the door can be improved.

The method of filling the filler member 52 in the through holes 51 is not applied only to the front panel 50 of the refrigerator door. Of course, the method of filling the filler member 52 in the through holes 51 may be applied to a case that a filler member is filled in through holes formed in a plate, such as an iron plate. That is, the method of filling the filler member 52 in the through holes 51 may also be applied to a kitchen home appliance, such as a cooking device, as well as the refrigerator.

As described above, in accordance with embodiments of the present disclosure, a front panel of a refrigerator is formed of a metal material, and a display unit is hidden in an internal space of a door, and information displayed on the display unit can be seen to the outside through holes formed in the front panel. Thus, an aesthetic appeal of the refrigerator can be improved.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
 a body;
 storage compartments formed inside the body; and
 a door that opens/closes the storage compartments,
 wherein the door comprises
  a front panel that constitutes a front-most side of the door and that is formed of a metal plate material, the front panel having through holes that pass through the front panel, wherein the through holes constitute a predetermined shape;
  a rear panel that is coupled to the rear of the front panel and constitutes a rear side of the door;
  a foaming space formed between the front panel and the rear panel;
  an adiabatic material foamed in the foaming space; and
  a display unit comprising a display portion having a shape corresponding to the shape of the through holes and displaying information when at least a portion of the display portion is turned on or off, the display unit disposed at a rear side of the front panel so that a position of the display portion corresponds to a position of the through holes.

2. The refrigerator of claim 1, wherein the door further comprises:
 an upper cap comprising a body portion and an accommodation space formed inside the body portion so as to accommodate the display unit, the upper cap being coupled to an upper part of the front panel;
 a lower cap coupled to a lower part of the front panel; and
 a sealing member disposed on a front side of the body portion of the upper cap so as to seal a space between the body portion of the upper cap and the front panel,
 wherein the front of the accommodation space is open so that light of the display unit is diffused into the through holes, and
 the upper cap is disposed to closely contact a rear side of the front panel so that the adiabatic material in the foaming space is prevented from permeating the accommodation space.

3. The refrigerator of claim 2, wherein the upper cap further comprises an insertion groove which is formed in a top end of the body portion and through which the display unit is inserted into the accommodation space.

4. The refrigerator of claim 1, wherein the display unit further comprises:
 a light source portion that emits light; and
 a guide portion that guides light of the light source portion to the display portion.

5. The refrigerator of claim 4, wherein the display unit further comprises a cover sheet on which the display portion is formed and which is coupled to the guide portion.

6. The refrigerator of claim 1, wherein the predetermined shape of the display portion comprises at least one selected from the group consisting of a picture, a character, a number, and a symbol.

7. The refrigerator of claim 4, wherein the guide portion comprises guide holes formed to have sizes thereof gradually increasing from the light source portion to the display portion.

8. The refrigerator of claim 1, further comprising a filler member filled in the through holes.

9. The refrigerator of claim 8, wherein the filler member is a silicon resin or an ultraviolet (UV) resin.

10. The refrigerator of claim 1, wherein a diameter of the through holes is 0.1 to 0.5 mm.

11. The refrigerator of claim 1, wherein a distance between the through holes is 0.3 to 1.5 mm.

12. The refrigerator of claim 1, wherein a thickness of the front panel is 0.6 mm or less.

13. The refrigerator of claim 1, wherein the through holes are formed through an etching process or a laser drilling process.

14. The refrigerator of claim 1, wherein the display unit further comprises an input unit having a capacitance touch button, and
 the input unit senses touch of a particular region of the front panel corresponding to the capacitance touch button and receives operating instructions of the refrigerator.

15. The refrigerator of claim 1, wherein the door further comprises a cover coupled to the insertion groove so as to seal the insertion groove after the display unit has been inserted into the accommodation space through the insertion groove.

16. A refrigerator comprising:
 a body;
 storage compartments formed inside the body; and
 a door that opens/closes the storage compartments,
 wherein the door comprises
  a front panel that constitutes a front-most side of the door and that is formed of a metal plate material, the front panel having through holes that pass through the front panel, wherein the through holes constitute a predetermined shape;
  a rear panel that is coupled to the rear of the front panel and constitutes a rear side of the door;
  a display unit comprising a display portion having a shape corresponding to the shape of the through holes and displaying information when at least a portion of the display portion is turned on or off, the display unit disposed at a rear side of the front panel so that a position of the display portion corresponds to a position of the through holes; and
  a filler member filled in the through holes so that foreign substances are prevented from permeating an internal space of the through holes.

17. The refrigerator of claim 16, wherein the filler member is an ultraviolet (UV) paint.

18. The refrigerator of claim 16, wherein the filler member does not overflow to a surface of a front side or a rear side of the front panel except the internal space of the through holes.

19. The refrigerator of claim 16, wherein the filler member is transparent.

20. The refrigerator of claim 16, wherein a diameter of the through holes is 0.1 to 0.5 mm.

21. The refrigerator of claim 16, wherein a distance between the through holes is 0.3 to 1.5 mm.

22. The refrigerator of claim 16, wherein a thickness of the front panel is 0.6 mm or less.

\* \* \* \* \*